Patented Mar. 1, 1938

2,109,592

UNITED STATES PATENT OFFICE 2,109,592

PREPARATION OF PLASTICS

Maurice L. Macht, Jersey City, and Alan F. Randolph, Montclair, N. J., assignors, by mesne assignments, to E. I. du Pont de Nemours & Company, Wilmington, Del., a corporation of Delaware No Drawing. Application April 1, 1936, Serial No. 72,218

12 Claims. (Cl. 106—22)

This invention relates to the preparation of plastics and, more particularly, relates to a process whereby solid coloring matter or other solid minor ingredients of a plastic composition may be uniformly distributed throughout a mass of plastic without the necessity of using either volatile or non-volatile liquid.

In the plastics art, particularly in the preparation of molding compounds, the working up of the plastic in the substantial absence of liquids, except for plasticizers which may be liquid, is becoming more and more important. This method of procedure usually involves kneading the components of a batch of plastic in a masticator mixer, such as a Banbury mixer, or other mixer adapted to give the plastic a severe kneading action. An advantage of this procedure is that it requires only a matter of a few minutes kneading to obtain a homogeneous batch of plastic. However, this short time of kneading, or homogenizing, otherwise highly advantageous, makes the uniform incorporation of solid coloring matter, or other solid minor ingredients of the composition, in the plastic a difficult problem.

An object of the present invention is to provide an economical and practical process for uniformly and thoroughly distributing and dispersing solid coloring matter, or other solid minor ingredient, in and through a batch of plastic, without the necessity of using a liquid. A further object is to provide such a process wherein the uniform distribution of the solid minor ingredient of the plastic is insured even though the batch of plastic, as a whole, is only kneaded for a matter of a few minutes. Other objects of the invention will be apparent from the description given hereinafter.

The above objects are accomplished according to the present invention by dry-grinding a solid minor ingredient, such as solid coloring matter, solid lubricant, or the like, to go into a batch of plastic, with a portion of the binder ingredient of the batch until a homogeneous, pulverulent mass is obtained, adding said pulverulent mass to the rest of the material making up the batch, and homogenizing the whole in any desired manner.

Throughout the specification and claims the term "binder ingredient" has been used to designate that ingredient, or a combination of ingredients, forming, with or without plasticizer, the continuous phase of a plastic substance to which its plastic properties are primarily due, as distinguished from fillers, pigments, dyestuffs, lubricants, plasticizers, and the like. Typical binder ingredients well known in the art include cellulose esters such as cellulose acetate and propionate, cellulose ethers as ethyl and benzyl cellulose, various polymerized organic compounds as polyvinyl resins, polymerized esters of acrylic and alkacrylic acids.

More specifically, the present invention comprises, in connection with the preparation of a batch of plastic having a cellulose derivative as the binder ingredient, the dry-grinding of a pigment or solid dyestuff in a ball- or pebble-mill together with from 3–20, preferably 3–6, times its weight of the cellulose derivative until the pigment or dyestuff is thoroughly comminuted and dispersed through the cellulose derivative, adding the resulting pulverulent mixture, or a suitable portion thereof, to a batch comprising the cellulose derivative and other compounds to be compounded therewith, and proceeding with the compounding of the batch by kneading in a masticator mixer.

The following examples are given to illustrate the present invention, parts being given by weight:

*Example 1.*—A batch of molding compound is to be made having the following composition:

| | Parts |
|---|---|
| Cellulose acetate | 75 |
| Dimethoxyethyl phthalate | 25 |
| Zinc oxide | 4 |
| Cadmium yellow | 1 |

This batch is made by dry-grinding in a ball mill the five parts of solid coloring matter, (4 parts zinc oxide, 1 part cadmium yellow) and 20 parts of dry cellulose acetate flake until the coloring matter is uniformly dispersed through the ground cellulose acetate flake. The resulting pulverulent mixture is of almost impalpable particle size. This pulverulent mixture is then combined with the remaining 55 parts of dry cellulose acetate flake going into the batch, in suitably comminuted form, and with the 25 parts of dimethoxyethyl phthalate, the plasticizer for the cellulose acetate, and the whole batch thus assembled is processed by being kneaded in a masticator mixer for a few minutes until there is formed a homogeneous plastic mass.

The plastic mass formed in this manner will be uniformly colored and, upon being broken down into granular form and subjected to ordinary thermoplastic molding technique, it will yield articles of uniform color, free from visible agglomerations of pigment particles.

In commercial practice it is more convenient to prepare the pulverulent mixtures in comparatively large quantities so as to furnish a standing supply for use in successive batches of compound. This is illustrated in the following example, in which both pigments and dyestuff are simultaneously processed.

*Example 2.*—A cellulose acetate molding compound of the following composition is to be formed:

| | Parts |
|---|---|
| Cellulose acetate | 75 |
| Dimethyl phthalate | 25 |
| Titanium oxide | 0.053 |
| Madder lake | 0.021 |
| Alizarine purple lake B | 0.001 |

For the purpose of preparing a stock mixture for the coloring of successive batches, the following ingredients are pulverized together in a ball mill:

| | Grams |
|---|---|
| Cellulose acetate | 3000 |
| Titanium oxide | 530 |
| Madder lake | 210 |
| Alizarine purple lake B | 10 |

The resulting pulverulent mixture is made up of one part of solid coloring matter to four parts of cellulose acetate. After the dry-grinding has been carried out in a manner analogous to that in Example 1, the pulverulent mixture is ready for use for the purpose of coloring large batches.

To make up an assembled batch having the composition set forth at the beginning of this example, which composition includes a total of 0.075 part of solid coloring matter, the following will be used:

| | Parts |
|---|---|
| Cellulose acetate | 74.7 |
| Dimethyl phthalate | 25 |
| Pulverized mixture | 0.375 |

The batch thus made up is processed in the same manner as that of Example 1.

*Example 3.*—A batch of molding compound is to be made up according to the following formula:

| | Parts |
|---|---|
| Cellulose acetate | 78 |
| Dimethoxyethyl phthalate | 18 |
| Triphenyl phosphate | 4 |
| Rhodamine BX | 0.002 |

A stock mixture is made up by ball milling together 19 parts of cellulose acetate and one part of Rhodamine BX until a uniformly colored, homogeneous, impalpable powder has been formed. The complete batch is then made up by assembling the following:

| | Parts |
|---|---|
| Cellulose acetate | 78 |
| Dimethoxyethyl phthalate | 18 |
| Triphenyl phosphate | 4 |
| Pulverized mixture of acetate and dyestuff | 0.040 |

Due to the cellulose acetate in the pulverized mixture, there is a slight excess of cellulose acetate over the 78 parts called for in the formula but the excess is negligible for practical purposes. The ingredients thus assembled are then kneaded in a Banbury mixer as in Example 1.

*Example 4.*—A finely pulverized mixture of ethyl cellulose and pigment for the purpose of coloring ethyl cellulose molding compound is made by grinding together in a ball mill:

| | Pounds |
|---|---|
| Ethyl cellulose | 4.5 |
| Titanium dioxide | 0.5 |

A batch having the composition:

| | Parts |
|---|---|
| Ethyl cellulose | 100 |
| Triphenyl phosphate | 4 |
| Diamyl phthalate | 8 |
| Titanium dioxide | 0.2 | may be assembled as follows:

| | Parts |
|---|---|
| Ethyl cellulose | 98.2 |
| Triphenyl phosphate | 4 |
| Diamyl phthalate | 8 |
| Pulverized mixture of ethyl cellulose and titanium dioxide | 2 |

The batch so assembled is then processed by kneading same in a masticator mixer for two minutes whereby a plastic homogeneous and free from visible color specks is obtained.

*Example 5.*—The following ingredients are ground together in a ball mill until there is produced a finely ground, uniform powder:

| | Pounds |
|---|---|
| Polymerized methyl alpha methacrylate resin | 4 |
| Hydrated chromium oxide | 1 |

This mixture will be referred to below as Mixture A.

Similarly there are ground together the following ingredients:

| | Pounds |
|---|---|
| Polymerized methyl alpha methacrylate resin | 9 |
| Stearic acid | 1 |

This mixture will be referred to below as Mixture B.

It is desired to produce a homogeneous plastic having the following formula:

| | Parts |
|---|---|
| Polymerized methyl alpha methacrylate resin | 100 |
| Diamyl phthalate | 26 |
| Hydrated chromium oxide | 1 |
| Stearic acid | 2 |

This formula is obtained by assembling together the following:

| | Parts |
|---|---|
| Polymerized methyl alpha methacrylate resin | 78 |
| Diamyl phthalate | 26 |
| Mixture A | 5 |
| Mixture B | 20 |

The batch so assembled is then processed in a masticator mixer and yields a mass in which the pigment and lubricant are completely and homogeneously dispersed.

In the following examples are given combinations of dry, pulverizable, solid minor ingredients with dry, pulverizable binders (the latter mentioned first in each instance) which may be pulverized together to give a pulverulent mixture adapted to be assembled with other ingredients to give a uniform, homogeneous batch of plastic upon kneading for a short time:

*Example 6*

| | Parts |
|---|---|
| Cellulose acetate flake | 760 |
| Titanium dioxide | 140 |
| Cadmium yellow #1 | 48 |
| Rhodamine B extra | 2 |

Example 7

| | Parts |
|---|---|
| Cellulose acetate flake | 3 |
| Zinc oxide | 1 |

Example 8

| | Parts |
|---|---|
| Ethyl cellulose | 19 |
| Oil Red O | 1 |

Example 9

| | Parts |
|---|---|
| Benzyl cellulose | 9 |
| Titanium dioxide | 1 |

Example 10

| | Parts |
|---|---|
| Polymethyl alpha methacrylate | 12 |
| Ultramarine CU | 1 |
| Aluminum palmitate | 2 |

Example 11

| | Parts |
|---|---|
| Polymethyl alpha methacrylate | 7 |
| Stearic acid | 1 |

The above examples are merely illustrative and the invention is broadly applicable to all binder ingredients adapted to be ground to a pulverulent condition. Among such binder ingredients are the cellulose esters, the cellulose ethers, various polymerized organic compounds such as esters of methacrylic and acrylic acid. Where a binder ingredient is not adapted to be ground to pulverulent condition at room temperature, such binder ingredient may be used in the present invention by resorting to chilling. Also, in cases where the binder ingredient cannot be pulverized as a practical matter, the present invention may be employed by grinding the solid minor ingredient with a binder ingredient which is pulverizable and compatible with the chief binder ingredient to be used in the plastic and which, in the proportions it is to be used in the batch to be assembled, is unobjectionable or at least tolerable as a constituent of the binder. Frequently the proportion of pigment, or the like, to be introduced into a batch of plastic is so small that the amount of such foreign binder ingredient to be introduced with it would have no material influence upon the batch as a whole.

Those skilled in the art will recognize that the use of cellulose nitrate in the present invention is subject to a certain amount of risk as it is known to be a hazardous procedure to subject nitrocellulose in dry form to grinding or intensive kneading.

The minor solid ingredient of the plastic must likewise be adapted to be reduced to pulverulent condition by grinding. Solid coloring matter is generally applicable in the process of the present invention. Likewise, such solid lubricants as stearic acid, aluminum palmitate, aluminum stearate, zinc stearate, carnauba wax, candelilla wax, paraffin wax, and the like. The use of liquid lubricants such as mineral or vegetable oils in the preliminary grinding step is not feasible in the present invention. Also, liquid plasticizers must definitely be eliminated from the mix subjected to the grinding step and, in general, even solid plasticizers must not be introduced into the mixtures subjected to the grinding step. The reason for this is that the perfect dispersion of the pigment or lubricant is achieved only when a free flowing pulverulent mixture is obtained which can be readily distributed in the assembled batch of plastic, while the presence of even solid plasticizers is likely to result in the mixture caking under the heating and impact effects of grinding.

The proportion of binder ingredient to solid minor ingredient in the mix subjected to the grinding step may be varied widely. Ordinarily, it is preferred to use at least three times as much by weight of the binder ingredient as the solid coloring matter or lubricant. The process is advantageous even when the proportion of binder ingredient amounts to as much as 20 times the weight of the solid minor ingredient but practically a proportion of 3–6 times the weight of binder ingredient to solid minor ingredient has been found most useful. It will be understood that the solid minor ingredients, where more than one is being used, may be ground together with the binder ingredient or the solid minor ingredients may be ground separately with the binder ingredient to make two stock supplies of pulverulent mixtures, one containing one solid minor ingredient and one containing the other.

As far as the present invention is concerned, it is immaterial whether a large amount of binder ingredient and solid minor ingredient are ground up to form a stock supply, or whether the amount of these two ingredients ground up is merely sufficient for the particular batch of plastic being made up at the time.

As will be understood by those skilled in the art, any of the grinding apparatuses commonly used in the plastics industry will be adapted for making the pulverulent mixtures according to the first step in the process of the present invention. The conventional ball mill or pebble mill is preferred, although mills of other types, such as a hammer mill, may be used if adequate precautions are taken to avoid loss of ingredients which would alter the proportions and, further, that the material be ground finely enough to accomplish the purpose of the present invention.

The particular method of kneading the ingredients assembled for the batch to be made will be obvious to those skilled in the art. The kneading will preferably be done in a masticator mixer, such as a Banbury mixer, which is adapted to give the vigorous kneading desired, although in some instances the use of mixing rolls, or other mixing equipment, is feasible.

The ingredients, and proportions thereof, going to make up the batch with the pulverulent mix of binder ingredient and minor solid ingredient, will be determined by the usual considerations in arriving at a batch composition. What ingredients or what proportions are used does not have a critical bearing on the present invention. However, one of the chief advantages of the present invention is that the batch can be worked up by momentary kneading without using any liquid at all. Since many plasticizers are liquids, frequently the assembled batch will contain liquid plasticizer. On the other hand, as volatile liquids or non-volatile liquids are in no way necessary to get a perfectly homogeneous batch and their use, in general, is uneconomical and disadvantageous where it can be avoided, the process of the present invention will almost invariably be carried out from beginning to end in the absence of liquids other than the plasticizer which may be a liquid; in certain plastics plasticizer may be omitted entirely as those skilled in the art will understand.

This invention provides a simple, inexpensive, and satisfactory means for the preparation of plastics whereby solid minor ingredients such as pigments, dyestuffs, and lubricants may be distributed and dispersed homogeneously and completely throughout a batch of plastic without the necessity of using volatile or non-volatile liquid ingredients. A further advantage of the present invention is that no extra kneading or mixing of the plastic as a whole is necessitated and yet the dispersion of the solid minor ingredients is complete and there are no color specks, nor is there any objectionable non-uniform dispersion of solid ingredients in the plastic.

As many apparently widely different embodiments of this invention may be made without departing from the spirit and scope thereof, it is to be understood that the invention is not limited to the specific embodiments thereof except as defined in the appended claims.

We claim:

1. In the process of preparing a batch of solid homogeneous plastic having a solid minor ingredient uniformly dispersed therethrough, the steps comprising dry-grinding in the absence of solvents and plasticizers the solid minor ingredient of the batch with a portion of the organic binder ingredient of the batch until a homogeneous pulverulent mixture is obtained, adding said pulverulent mixture to the remainder of the binder ingredient and any other ingredients making up the batch, and severely kneading and masticating the whole until a homogeneous plastic is obtained.

2. In the process of preparing a batch of solid homogeneous plastic having solid coloring matter uniformly dispersed therethrough, the steps comprising dry-grinding in the absence of solvents and plasticizers the solid coloring matter of the batch with a portion of the organic binder ingredient of the batch until a homogeneous pulverulent mixture is obtained, adding said pulverulent mixture to the remainder of the binder ingredient and any other ingredients making up the batch, and severely kneading and masticating the whole until a homogeneous plastic is obtained.

3. In the process of preparing a batch of solid homogeneous plastic having a solid lubricant uniformly dispersed therethrough, the steps comprising dry-grinding in the absence of solvents and plasticizers the solid lubricant of the batch with a portion of the organic binder ingredient of the batch until a homogeneous pulverulent mixture is obtained, adding said pulverulent mixture to the remainder of the binder ingredient and any other ingredients making up the batch, and severely kneading and masticating the whole until a homogeneous plastic is obtained.

4. In the process of preparing a batch of solid homogeneous plastic comprising an organic binder ingredient, a plasticizer therefor, a solid lubricant and solid coloring matter uniformly dispersed therethrough, the steps comprising dry-grinding in the absence of solvents and plasticizers the solid lubricant and solid coloring matter with a portion of the binder ingredient of the batch until a homogeneous pulverulent mixture is obtained, adding said pulverulent mixture to the remainder of the binder ingredient and the plasticizer making up the batch, and severely kneading and masticating the whole until a homogeneous plastic is obtained.

5. In the process of preparing a batch of solid homogeneous plastic having a solid minor ingredient uniformly dispersed therethrough, the steps comprising dry-grinding in the absence of solvents and plasticizers the solid minor ingredient of the batch with a portion of the organic binder ingredient of the batch, said portion amounting to at least three times the weight of said minor ingredient, until a homogeneous pulverulent mixture is obtained, adding said pulverulent mixture to the remainder of the binder ingredient and any other ingredients making up the batch, and severely kneading and masticating the whole until a homogeneous plastic is obtained.

6. In the process of preparing a batch of solid homogeneous plastic having solid coloring matter uniformly dispersed therethrough, the steps comprising dry-grinding in the absence of solvents and plasticizers the solid coloring matter of the batch with a portion of the organic binder ingredient of the batch, said portion amounting to at least three times the weight of said solid coloring matter, until a homogeneous pulverulent mixture is obtained, adding said pulverulent mixture to the remainder of the binder ingredient and any other ingredients making up the batch, and severely kneading and masticating the whole until a homogeneous plastic is obtained.

7. In the process of preparing a batch of solid homogeneous plastic having a solid lubricant uniformly dispersed therethrough, the steps comprising dry-grinding in the absence of solvents and plasticizers the solid lubricant of the batch with a portion of the organic binder ingredient of the batch, said portion amounting to at least three times the weight of said solid lubricant, until a homogeneous pulverulent mixture is obtained, adding said pulverulent mixture to the remainder of the binder ingredient and any other ingredients making up the batch, and severely kneading and masticating the whole until a homogeneous plastic is obtained.

8. In the process of preparing a batch of solid homogeneous plastic comprising an organic binder ingredient, a plasticizer therefor, a solid lubricant and solid coloring matter uniformly dispersed therethrough, the steps comprising dry-grinding in the absence of solvents and plasticizers the solid lubricant and solid coloring matter with a portion of the binder ingredient of the batch, said portion amounting to at least three times the combined weight of said solid lubricant and solid coloring matter, until a homogeneous pulverulent mixture is obtained, adding said pulverulent mixture to the remainder of the binder ingredient and the plasticizer making up the batch, and severely kneading and masticating the whole until a homogeneous plastic is obtained.

9. In the process of preparing a batch of solid homogeneous plastic having, as the binder ingredient, a cellulose ester and having a solid minor ingredient uniformly dispersed therethrough, the steps comprising dry-grinding in the absence of solvents and plasticizers the solid minor ingredient of the batch with a portion of the cellulose ester until a homogeneous pulverulent mixture is obtained, adding said pulverulent mixture to the remainder of the cellulose ester and any other ingredients making up the batch, and severely kneading and masticating the whole until a homogeneous plastic is obtained.

10. In the process of preparing a batch of solid homogeneous plastic having, as the binder ingredient, cellulose acetate and having a solid minor ingredient uniformly dispersed therethrough, the steps comprising dry-grinding in the absence of solvents and plasticizers the solid minor ingredient of the batch with a portion of the cellulose acetate until a homogeneous pulverulent mixture is obtained, adding said pulverulent mixture to the remainder of the cellulose acetate and any other ingredients making up the batch, and severely kneading and masticating the whole until a homogeneous plastic is obtained.

11. In the process of preparing a batch of solid homogeneous plastic having, as the binder ingredient, cellulose ether and having a solid minor ingredient uniformly dispersed therethrough, the steps comprising dry-grinding in the absence of solvents and plasticizers the solid minor ingredient of the batch with a portion of the cellulose ether until a homogeneous pulverulent mixture is obtained, adding said pulverulent mixture to the remainder of the cellulose ether and any other ingredients making up the batch, and severely kneading and masticating the whole until a homogeneous plastic is obtained.

12. In the process of preparing a batch of solid homogeneous plastic having, as the binder ingredient, polymerized methyl methacrylate and having a solid minor ingredient uniformly dispersed therethrough, the steps comprising dry-grinding in the absence of solvents and plasticizers the solid minor ingredient of the batch with a portion of the polymerized methyl methacrylate until a homogeneous pulverulent mixture is obtained, adding said pulverulent mixture to the remainder of the polymerized methyl methacrylate and any other ingredients making up the batch, and severely kneading and masticating the whole until a homogeneous plastic is obtained.

MAURICE L. MACHT.
ALAN F. RANDOLPH.